United States Patent
Cabrera et al.

(10) Patent No.: US 9,323,926 B2
(45) Date of Patent: Apr. 26, 2016

(54) METHOD AND SYSTEM FOR INTRUSION AND EXTRUSION DETECTION

(71) Applicant: Intuit Inc., Mountain View, CA (US)

(72) Inventors: Luis Felipe Cabrera, Bellevue, WA (US); M. Shannon Lietz, San Marcos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 14/143,999

(22) Filed: Dec. 30, 2013

(65) Prior Publication Data

US 2015/0186641 A1 Jul. 2, 2015

(51) Int. Cl.
*H04L 29/06* (2006.01)
*G06F 21/55* (2013.01)

(52) U.S. Cl.
CPC ...... *G06F 21/554* (2013.01); *G06F 2221/2111* (2013.01)

(58) Field of Classification Search
CPC ..... G06F 21/55; G06F 21/552; G06F 21/554; G06F 21/56; G06F 21/564; H04L 63/145; H04L 63/1491; H04L 63/30
USPC .................................. 726/11, 23, 24
See application file for complete search history.

(56) References Cited

U.S. PATENT DOCUMENTS

| | | | |
|---|---|---|---|
| 5,731,991 A | 3/1998 | Kinra et al. | |
| 6,085,224 A | 7/2000 | Wagner | |
| 6,205,552 B1 | 3/2001 | Fudge | |
| 6,343,236 B1 | 1/2002 | Gibson et al. | |
| 6,549,932 B1 | 4/2003 | McNally et al. | |
| 6,651,183 B1 | 11/2003 | Gensler et al. | |
| 7,114,183 B1 | 9/2006 | Joiner | |
| 7,296,261 B2 | 11/2007 | Witchel et al. | |
| 7,426,745 B2 | 9/2008 | McCarty | |
| 7,506,371 B1 | 3/2009 | Ben-Natan | |

(Continued)

FOREIGN PATENT DOCUMENTS

| | | |
|---|---|---|
| EP | 2 541 420 | 1/2013 |
| WO | WO 02/091182 | 11/2002 |

(Continued)

OTHER PUBLICATIONS

Lietz et al., "Method and System for Dynamic and Comprehensive Vulnerability Management," U.S. Appl. No. 14/052,971, filed Oct. 14, 2013.

(Continued)

*Primary Examiner* — Izunna Okeke
*Assistant Examiner* — Hee Song
(74) *Attorney, Agent, or Firm* — Hawley Troxell Ennis & Hawley LLP; Philip McKay

(57) ABSTRACT

A hypervisor includes an analysis trigger monitoring system. One or more analysis trigger parameters are defined and analysis trigger data representing the analysis trigger parameters is generated. The analysis trigger data is then provided to the analysis trigger monitoring system and the analysis trigger monitoring system is used to monitor at least a portion of the message traffic sent to, and/or sent from, a virtual asset controlled by the hypervisor to detect any message including one or more of the one or more analysis trigger parameters. A copy of at least a portion of any detected message including one or more of the one or more analysis trigger parameters is then transferred to one or more analysis systems for further analysis.

24 Claims, 3 Drawing Sheets

(56) References Cited

U.S. PATENT DOCUMENTS

| | | | |
|---|---|---|---|
| 7,552,424 B1 | 6/2009 | Bischof et al. | |
| 7,640,458 B2 | 12/2009 | Rao et al. | |
| 7,788,235 B1 | 8/2010 | Yeo | |
| 7,792,256 B1 | 9/2010 | Arledge et al. | |
| 7,831,570 B2 | 11/2010 | Sack et al. | |
| 7,925,527 B1 | 4/2011 | Flam | |
| 7,944,355 B2 | 5/2011 | Kumar et al. | |
| 7,996,836 B1* | 8/2011 | McCorkendale et al. | 718/1 |
| 8,001,422 B1 | 8/2011 | Sun et al. | |
| 8,095,962 B2 | 1/2012 | Condon | |
| 8,171,485 B2 | 5/2012 | Muller | |
| 8,171,554 B2* | 5/2012 | Elovici et al. | 726/24 |
| 8,181,036 B1* | 5/2012 | Nachenberg | 713/189 |
| 8,281,399 B1 | 10/2012 | Chen et al. | |
| 8,312,516 B1 | 11/2012 | Malatesta | |
| 8,510,821 B1 | 8/2013 | Brandwine et al. | |
| 8,555,388 B1 | 10/2013 | Wang et al. | |
| 8,561,126 B2 | 10/2013 | Ananthanarayanan et al. | |
| 8,561,127 B1 | 10/2013 | Agrawal et al. | |
| 8,615,785 B2 | 12/2013 | Elrod et al. | |
| 8,688,820 B1 | 4/2014 | Bhogi et al. | |
| 8,776,050 B2 | 7/2014 | Plouffe et al. | |
| 8,813,225 B1 | 8/2014 | Fuller et al. | |
| 9,049,105 B1 | 6/2015 | Feinstein et al. | |
| 9,112,841 B1 | 8/2015 | Brandwine et al. | |
| 2002/0099992 A1 | 7/2002 | Distler et al. | |
| 2002/0116404 A1 | 8/2002 | Cha et al. | |
| 2003/0051154 A1 | 3/2003 | Barton et al. | |
| 2003/0084327 A1 | 5/2003 | Lingafelt et al. | |
| 2003/0195959 A1 | 10/2003 | Labadie et al. | |
| 2004/0006704 A1 | 1/2004 | Dahlstrom et al. | |
| 2004/0181775 A1 | 9/2004 | Anonsen et al. | |
| 2004/0237093 A1 | 11/2004 | Sluiman et al. | |
| 2005/0066309 A1 | 3/2005 | Creamer et al. | |
| 2005/0091304 A1 | 4/2005 | Trayler | |
| 2005/0155013 A1 | 7/2005 | Carrigan | |
| 2005/0172162 A1 | 8/2005 | Takahashi et al. | |
| 2005/0182969 A1 | 8/2005 | Ginter et al. | |
| 2005/0193231 A1 | 9/2005 | Scheuren | |
| 2005/0193269 A1 | 9/2005 | Haswell et al. | |
| 2005/0204151 A1 | 9/2005 | Fang et al. | |
| 2005/0278790 A1 | 12/2005 | Birk et al. | |
| 2006/0090206 A1 | 4/2006 | Ladner et al. | |
| 2006/0101520 A1 | 5/2006 | Schumaker et al. | |
| 2006/0184838 A1 | 8/2006 | Singonahalli et al. | |
| 2006/0293940 A1 | 12/2006 | Tsyganskiy et al. | |
| 2007/0027999 A1 | 2/2007 | Allen et al. | |
| 2007/0079168 A1 | 4/2007 | Sivakumar et al. | |
| 2007/0094711 A1 | 4/2007 | Corley et al. | |
| 2007/0180509 A1 | 8/2007 | Swartz et al. | |
| 2007/0185875 A1 | 8/2007 | Chang et al. | |
| 2007/0250424 A1 | 10/2007 | Kothari | |
| 2008/0016570 A1* | 1/2008 | Capalik | 726/23 |
| 2008/0025288 A1 | 1/2008 | Benner et al. | |
| 2008/0044018 A1 | 2/2008 | Scrimsher et al. | |
| 2008/0141332 A1* | 6/2008 | Treinen | H04L 63/1416 726/1 |
| 2008/0148398 A1 | 6/2008 | Mezack et al. | |
| 2008/0262990 A1* | 10/2008 | Kapoor et al. | 706/20 |
| 2008/0263670 A1 | 10/2008 | Stavrica | |
| 2008/0295076 A1 | 11/2008 | McKain et al. | |
| 2009/0007264 A1 | 1/2009 | Chatterjee et al. | |
| 2009/0089682 A1 | 4/2009 | Baier et al. | |
| 2009/0106838 A1 | 4/2009 | Clark et al. | |
| 2009/0199273 A1 | 8/2009 | Yalamanchi | |
| 2009/0254990 A1* | 10/2009 | McGee | 726/22 |
| 2009/0288078 A1 | 11/2009 | Makonahalli et al. | |
| 2009/0300045 A1 | 12/2009 | Chaudhry et al. | |
| 2009/0300423 A1 | 12/2009 | Ferris | |
| 2009/0319527 A1 | 12/2009 | King et al. | |
| 2010/0070964 A1 | 3/2010 | Blumfield et al. | |
| 2010/0077203 A1 | 3/2010 | Ogawa et al. | |
| 2010/0122317 A1 | 5/2010 | Yadav | |
| 2010/0192220 A1 | 7/2010 | Heizmann et al. | |
| 2010/0212010 A1 | 8/2010 | Stringer et al. | |
| 2010/0217850 A1 | 8/2010 | Ferris | |
| 2010/0251363 A1 | 9/2010 | Todorovic | |
| 2010/0257599 A1 | 10/2010 | Gleichauf | |
| 2010/0269121 A1 | 10/2010 | Montesissa et al. | |
| 2010/0306354 A1 | 12/2010 | DeHaan et al. | |
| 2010/0318481 A1 | 12/2010 | Feynman | |
| 2011/0029957 A1 | 2/2011 | Shufer et al. | |
| 2011/0034182 A1 | 2/2011 | Issa et al. | |
| 2011/0047621 A1 | 2/2011 | Brando et al. | |
| 2011/0055921 A1 | 3/2011 | Narayanaswamy et al. | |
| 2011/0138382 A1 | 6/2011 | Hauser et al. | |
| 2011/0138469 A1 | 6/2011 | Ye et al. | |
| 2011/0145657 A1 | 6/2011 | Bishop et al. | |
| 2011/0154324 A1 | 6/2011 | Pagan et al. | |
| 2011/0208677 A1 | 8/2011 | Zhou et al. | |
| 2011/0238855 A1* | 9/2011 | Korsunsky et al. | 709/231 |
| 2012/0005750 A1 | 1/2012 | Satish | |
| 2012/0039336 A1* | 2/2012 | Richmond et al. | 370/392 |
| 2012/0072985 A1 | 3/2012 | Davne et al. | |
| 2012/0110672 A1* | 5/2012 | Judge | H04L 51/12 726/25 |
| 2012/0117654 A1 | 5/2012 | Yalakanti | |
| 2012/0151488 A1 | 6/2012 | Arcese et al. | |
| 2012/0185390 A1 | 7/2012 | Palnitkar et al. | |
| 2012/0185913 A1 | 7/2012 | Martinez et al. | |
| 2012/0209947 A1 | 8/2012 | Glaser et al. | |
| 2012/0210437 A1 | 8/2012 | Karande et al. | |
| 2012/0233668 A1 | 9/2012 | Leafe et al. | |
| 2012/0303776 A1 | 11/2012 | Ferris | |
| 2012/0304300 A1 | 11/2012 | LaBumbard | |
| 2012/0311157 A1 | 12/2012 | Erickson et al. | |
| 2012/0324572 A1 | 12/2012 | Gordon et al. | |
| 2012/0324576 A1 | 12/2012 | Clark et al. | |
| 2013/0019242 A1 | 1/2013 | Chen et al. | |
| 2013/0046667 A1 | 2/2013 | Hill et al. | |
| 2013/0054792 A1 | 2/2013 | Sharaf | |
| 2013/0055398 A1 | 2/2013 | Li et al. | |
| 2013/0067067 A1 | 3/2013 | Miri et al. | |
| 2013/0091376 A1 | 4/2013 | Raspudic et al. | |
| 2013/0097316 A1 | 4/2013 | Bender et al. | |
| 2013/0104237 A1 | 4/2013 | Riley et al. | |
| 2013/0117809 A1 | 5/2013 | McDougal et al. | |
| 2013/0117852 A1 | 5/2013 | Stute | |
| 2013/0160072 A1 | 6/2013 | Reus et al. | |
| 2013/0174259 A1 | 7/2013 | Pearcy et al. | |
| 2013/0185795 A1 | 7/2013 | Winn et al. | |
| 2013/0238786 A1 | 9/2013 | Khesin | |
| 2013/0247135 A1 | 9/2013 | Kundu et al. | |
| 2013/0276152 A1 | 10/2013 | Hirsch et al. | |
| 2013/0291068 A1 | 10/2013 | Huang al. | |
| 2013/0291087 A1 | 10/2013 | Kailash et al. | |
| 2013/0305357 A1 | 11/2013 | Ayyagari et al. | |
| 2013/0305369 A1 | 11/2013 | Karta et al. | |
| 2013/0305371 A1 | 11/2013 | Figlin et al. | |
| 2013/0339514 A1 | 12/2013 | Crank et al. | |
| 2013/0347131 A1* | 12/2013 | Mooring et al. | 726/29 |
| 2014/0013452 A1 | 1/2014 | Aissi et al. | |
| 2014/0026122 A1 | 1/2014 | Markande et al. | |
| 2014/0026179 A1 | 1/2014 | Devarajan et al. | |
| 2014/0068784 A1 | 3/2014 | Merkow et al. | |
| 2014/0082621 A1 | 3/2014 | Fitzgerald et al. | |
| 2014/0089204 A1 | 3/2014 | Spies et al. | |
| 2014/0165130 A1 | 6/2014 | Zaitsev | |
| 2014/0173738 A1 | 6/2014 | Condry et al. | |
| 2014/0189680 A1 | 7/2014 | Kripalani | |
| 2014/0214460 A1 | 7/2014 | Rahnama | |
| 2014/0258446 A1 | 9/2014 | Bursell | |
| 2014/0258715 A1 | 9/2014 | Rodniansky | |
| 2014/0259169 A1* | 9/2014 | Harrison | G06F 21/554 726/23 |
| 2014/0282840 A1 | 9/2014 | Guinan | |
| 2014/0289854 A1 | 9/2014 | Mahvi | |
| 2014/0317737 A1* | 10/2014 | Shin et al. | 726/23 |
| 2014/0344933 A1* | 11/2014 | Huh | H04L 63/0428 726/23 |
| 2015/0032587 A1 | 1/2015 | Broom et al. | |
| 2015/0052108 A1 | 2/2015 | Volk et al. | |

(56) References Cited

U.S. PATENT DOCUMENTS

| | | | |
|---|---|---|---|
| 2015/0052402 A1 | 2/2015 | Gurumurthy et al. | |
| 2015/0095691 A1 | 4/2015 | Edwards | |
| 2015/0128246 A1* | 5/2015 | Feghali | H04L 63/0209 726/13 |

FOREIGN PATENT DOCUMENTS

| | | |
|---|---|---|
| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. No. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Lietz et al., "Method and System for Secure Delivery of Information to Computing Environments," U.S. Appl. No. 14/319,286, filed Jun. 30, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

* cited by examiner

METHOD AND SYSTEM FOR INTRUSION AND EXTRUSION DETECTION

BACKGROUND

As various forms of distributed computing, such as cloud computing, have come to dominate the computing landscape, security has become a bottleneck issue that currently prevents the complete migration of various capabilities and systems associated with sensitive data, such as financial data, to cloud-based infrastructures, and/or other distributive computing models. This is because many owners and operators of data centers that provide access to data and other resources are extremely hesitant to allow their data and resources to be accessed, processed, and/or otherwise used, by virtual assets, such as virtual machine and server instances in the cloud.

In a cloud computing environment, various virtual assets, such as, but not limited to, virtual machine instances, data stores, and various services, are created, launched, or instantiated, in the cloud for use by an "owner" of the virtual asset, herein also referred to as a user of the virtual asset.

Herein the terms "owner" and "user" of a virtual asset include, but are not limited to, applications, systems, and sub-systems of software and/or hardware, as well as persons or entities associated with an account number, or other identity, through which the virtual asset is purchased, approved managed, used, and/or created.

One long standing problem associated with cloud computing environments is the fact that malware can be introduced into the cloud computing environment, just as in any computing environment, via communications conducted by one or more virtual machines operating in the cloud computing environment. The introduction of malware into a virtual machine, and therefore into an application, service, enterprise, or cloud infrastructure of a cloud computing environment is known as intrusion. However, once introduced, some forms of malware take control of some, or all, of the infected virtual machine functionality and use the virtual machine to send outbound messages and data. This outbound malware mechanism is referred to as extrusion.

The detection of both malware intrusion and extrusion is an important part of making cloud computing environments more secure. However, a given cloud computing environment can include hundreds, thousands, or even millions, of virtual machines and other assets, owned or used by hundreds, thousands, or even millions, of parties. Consequently, detecting malware intrusion and extrusion is an extremely difficult and resource intensive task.

What is needed is a method and system for detecting malware intrusion and extrusion that uses existing cloud based infrastructure and components to effectively and efficiently help detect intrusion and extrusion events.

SUMMARY

In accordance with one embodiment, a method and system for hypervisor assisted intrusion and extrusion detection includes providing a hypervisor through which a virtual asset is controlled. In one embodiment, the hypervisor includes an analysis trigger monitoring system.

In one embodiment, one or more analysis trigger parameters are defined and analysis trigger data representing the analysis trigger parameters is generated. The analysis trigger data is then provided to the analysis trigger monitoring system and the analysis trigger monitoring system is used to monitor at least a portion of the message traffic sent to, and/or sent from, the virtual asset controlled by the hypervisor to detect any message including one or more of the one or more analysis trigger parameters.

In one embodiment, any detected message including one or more of the one or more analysis trigger parameters is classified as a suspect message. In one embodiment, for each suspect message, suspect message copy data is generated representing a copy of at least a portion of the suspect message. In one embodiment, the suspect message copy data is then transferred to one or more analysis systems for further analysis.

Figure 1:
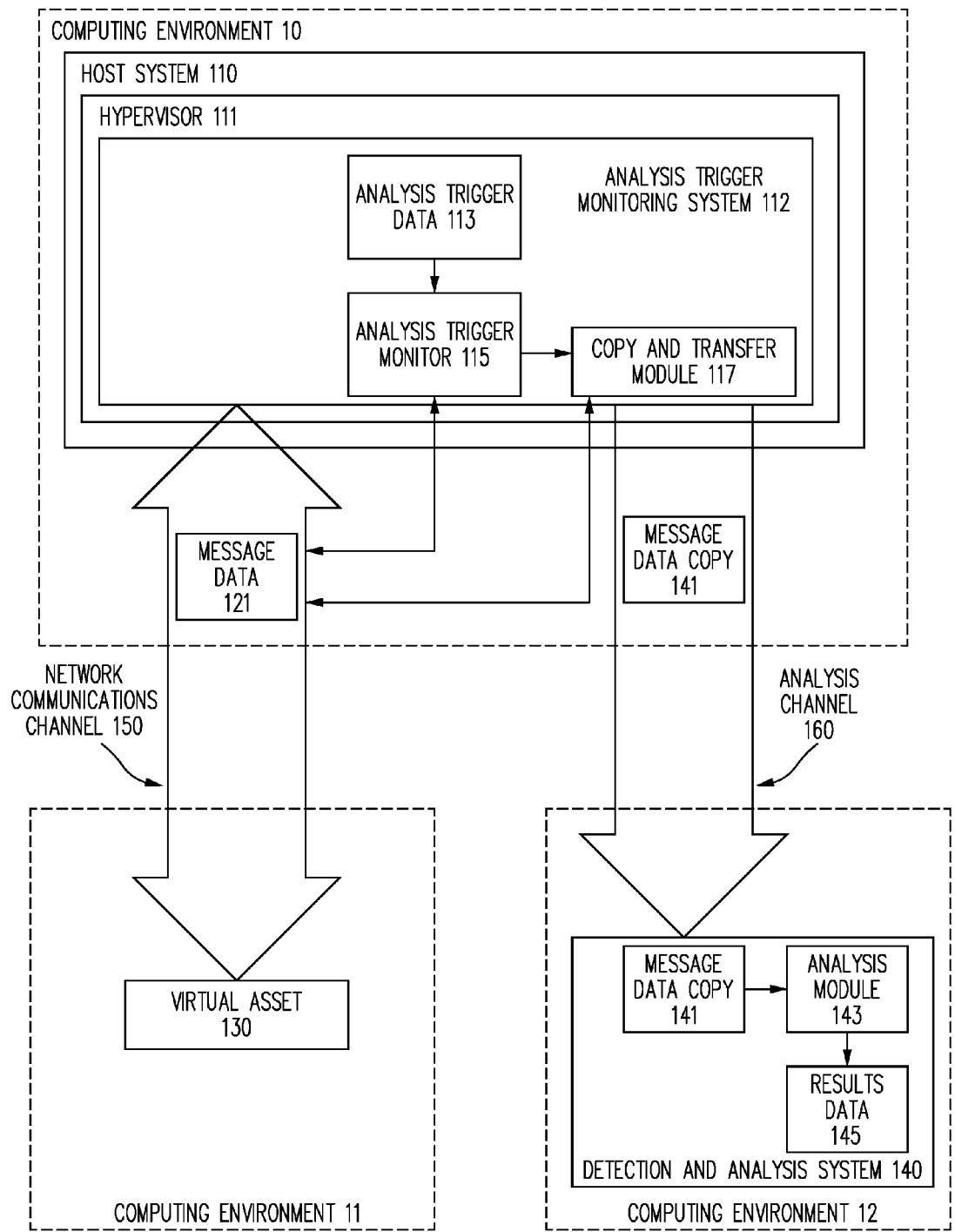
FIG. 1 is a functional block diagram showing the interaction of various elements for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for hypervisor assisted intrusion and extrusion detection includes a process for hypervisor assisted intrusion and extrusion detection implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for hypervisor assisted intrusion and extrusion detection are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

FIG. 1 is a functional diagram of the interaction of various elements associated with one embodiment of the method and system for hypervisor assisted intrusion and extrusion detection discussed herein. Of particular note, the various elements in FIG. 1 are shown for illustrative purposes as being associated with specific computing environments, such as computing environment 10, computing environment 11, and computing environment 12. However, the exemplary placement of the various elements within these environments and systems in FIG. 1 is made for illustrative purposes only and, in various embodiments, any individual element shown in FIG. 1, or combination of elements shown in FIG. 1, can be implemented and/or deployed on any of one or more various computing environments or systems, and/or architectural or infrastructure components, such as one or more hardware systems, one or more software systems, one or more data centers, more or more clouds or cloud types, one or more third party service capabilities, or any other computing environments, architectural, and/or infrastructure components as discussed herein, and/or as known in the art at the time of filing, and/or as developed/made available after the time of filing.

In addition, the elements shown in FIG. 1, and/or the computing environments, systems and architectural and/or infrastructure components, deploying the elements shown in FIG. 1, can be under the control of, or otherwise associated with, various parties or entities, or multiple parties or entities, such as, but not limited to, the owner of a data center keeping or accessing the secrets data, a party and/or entity providing all or a portion of a cloud-based computing environment, the owner or a provider of a service, the owner or provider of one or more resources accessible using the secrets, and/or any other party and/or entity providing one or more functions, and/or any other party and/or entity as discussed herein, and/or as known in the art at the time of filing, and/or as made known after the time of filing.

In one embodiment, a cloud computing environment is provided including one or more virtual assets associated with, and controlled by, a hypervisor.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, the virtual asset creation data is generated through a virtual asset creation system such as a virtual asset template through which the creator of a virtual asset can generate operational logic and assign resources and attributes to the virtual asset.

As used herein, the term "hypervisor", also referred to as a virtual machine monitor (VMM), indicates computer software, firmware, or hardware that creates, and/or runs/controls, virtual assets in a cloud computing environment. In various embodiments, the hypervisor is implemented, or run, in association with, a host system. In various embodiments, the host system itself hosts the one or more virtual assets. In general, a hypervisor manages the execution of the virtual assets and, in particular, is charged with controlling, and/or relaying, message traffic coming into the one or more virtual assets, and/or being transmitted out of the one or more virtual assets.

In various embodiments, the message traffic to, from, and between, the virtual assets controlled by the hypervisor is transmitted through at least one communications channel, e.g., a network communications channel, herein also referred to as a first communications channel.

In various embodiments, the message traffic to, from, and between the virtual assets controlled by the hypervisor are susceptible to the introduction of malware and, in particular, intrusion and extrusion related malware.

As noted above, the fact that malware can be introduced into the cloud computing environment is a long standing problem. As also noted above, the introduction of malware into a virtual asset via one or more messages included in message traffic controlled by the hypervisor coming into the virtual asset, and therefore into an application, service, enterprise, or cloud infrastructure of a cloud computing environment, is known as intrusion. However, as also noted above, once introduced, some forms of malware take control of some, or all, of the infected virtual asset functionality and use the virtual asset to send outbound messages and data through the message traffic controlled by the hypervisor. This outbound malware mechanism is referred to as extrusion.

Consequently, the detection of both malware intrusion and extrusion is an important part of making cloud computing environments more secure. However, a given cloud computing environment can include hundreds, thousands, or even millions, of virtual assets, owned or used by hundreds, thousands, or even millions, of parties. Consequently, detecting malware intrusion and extrusion is currently an extremely difficult and resource intensive task.

To address this issue, as discussed below, in one embodiment, a hypervisor controlling at least one virtual asset is provided an analysis trigger monitoring system. In various embodiments, the analysis trigger monitoring system is a module of software, and/or firmware, and/or hardware, capable of monitoring at least a portion of the message traffic to, between, and from, the at least one virtual asset controlled by the hypervisor.

Referring to FIG. 1, hypervisor 111 is shown as being implemented as part of host system 110 in computing environment 10. As discussed above, host system 110 and hypervisor 111 are shown as being implemented in computing environment 10 for illustrative purposes only. In various embodiments, computing environment 10, and host system 110, can be implemented in any one of a number of computing environments, including, but not limited to, a data center, and/or a cloud infrastructure control center, associated with one or more of, an application provider, a service provider, an enterprise, a cloud computing infrastructure provider, and/or any other party and/or system as discussed herein, and/or as known in the art at the time of filing, and/or as developed or becomes known after the time of filing.

As also shown in FIG. 1, virtual asset 130 is implemented, in this specific illustrative example, in a second computing environment 11. As noted above, virtual asset 130 is shown in FIG. 1 as being implemented in second computing environment 11 for illustrative purposes only. In other embodiments, virtual asset 130 can be implemented in the same computing environment as host system 110. As seen in FIG. 1, network communications channel 150, also referred to herein as a first communications channel, is used to relay message data 121 to and from virtual asset 130.

While a single example of message data 121 is shown in FIG. 1, those of skill in the art will recognize that message data 121 is representative of multiple messages making up message traffic to and from virtual asset 130 as controlled by hypervisor 111.

In addition, while a single virtual asset 130 is shown in FIG. 1 for simplicity and illustrative purposes, those of skill in the art will readily recognize that virtual asset 130 is representative of any number of virtual assets and, in some embodiments, hundreds, thousands, or even millions, of virtual assets are represented by single virtual asset 130 shown in FIG. 1. In addition, hypervisor 111 is representative of potentially tens, hundreds, or even thousands, of hypervisors implemented on multiple host systems.

In one embodiment, one or more analysis trigger parameters are defined such that if one or more of the one or more analysis trigger parameters are detected in a message to, or from, a virtual asset, then that message is deemed a suspect message that is potentially associated with an intrusion or extrusion attack on the virtual asset, and/or the computing environment.

In various embodiments, specific examples of analysis trigger parameters include, but are not limited to, the presence of an IP address in a message indicating a designated suspect origin or destination. In one embodiment, this analysis trigger parameter is used to detect messages coming from, or going to, a designated suspicious entity that is suspected of being associated with malware. In various embodiments, the IP addresses associated with designated suspicious entities, and/or the identity of the entities themselves, is provided by one or more third parties.

In various embodiments, specific examples of analysis trigger parameters include, but are not limited to, the presence of an IP address in a message indicating a designated suspect geographical region. In one embodiment, this analysis trigger parameter is used to detect messages coming from, or going to, geographical locations that are known to be associated with malware. In various embodiments, the geographical locations known to be associated with malware are provided by the one or more third parties.

In various embodiments, specific examples of analysis trigger parameters include, but are not limited to, the presence of an IP address in a message indicating an origin or destination that is not included on a list of authorized, or expected, origins or destinations of messages to be received by, or transmitted from, the virtual asset. In one embodiment, this analysis trigger parameter is used to detect message traffic that would not be expected to be generated in the normal course of operation of the virtual asset according to its operational mission.

In various embodiments, specific examples of analysis trigger parameters include, but are not limited to, the presence of an IP address in a message indicating a geographical location that is not included on a list of authorized, or expected, geographical locations to be associated with messages to be received by, or transmitted from, and the virtual asset. In one embodiment, this analysis trigger parameter is used to detect message traffic that would not be expected to be generated in the normal course of operation of the virtual asset according to its operational instructions.

In various embodiments, specific examples of analysis trigger parameters include, but are not limited to, setting a threshold maximum message size and determining that a given message is of a size exceeding the threshold maximum message size. In one embodiment, this analysis trigger parameter takes advantage of the fact that many forms of malware require message sizes larger than those normally associated with a given virtual asset in order to deliver the malware necessary to execute the malicious intent.

In various embodiments, specific examples of analysis trigger parameters include, but are not limited to, setting a threshold minimum message size and determining that a given message is of a size that is less than the threshold minimum message size. In one embodiment, this analysis trigger is used to detect messages of a size that is smaller than a message size determined to be typical with respect to a given virtual asset, and that are therefore suspicious.

In various embodiments, specific examples of analysis trigger parameters include, but are not limited to, analysis trigger parameters based on frequency analysis of the access pattern indicating that messages arrive too frequently or too infrequently.

In various embodiments, specific examples of analysis trigger parameters include, but are not limited to, a hash value of the message data that is not included in a list of allowed hash values. In one embodiment, this analysis trigger parameter is used in conjunction with a hash-based analysis of at least part of a given message being sent to, and or transmitted from, a virtual asset. In one embodiment, allowable hash values are defined and then a hash is performed on at least part of a given message. In one embodiment, if the hash of the portion of the given message does not match any of the allowed hash values, the message is determined to be suspect.

In various embodiments, specific examples of analysis trigger parameters include, but are not limited to, an MD5 value of the message data that is not included in a list of allowed MD5 values.

MD5 (Message-Digest algorithm five) is a widely used cryptographic hash function producing a 128 bit (16 byte) hash value that is typically expressed as a 32 digit hexadecimal number. In one embodiment, the MD5 algorithm is applied to at least part of the message data associated with a given message and the resulting MD5 value is compared with a list of allowed MD5 values. If the resulting MD5 value does not match any of the allowed MD5 values, then the message is considered suspect.

In various embodiments, specific examples of analysis trigger parameters include, but are not limited to, the specific identity of the sender of the message and adding the ability to have a per-message offline analysis that determines whether to trigger that a message is suspect. In one embodiment, the analysis can be in-line or asynchronous, off-line that would then miss an initial or first example of an intrusion or extrusion message but would be used for other "like messages" where the criteria for "like" is an analysis trigger parameter that can be dynamically installed in the trigger monitoring system.

In various embodiments, specific examples of analysis trigger parameters include, but are not limited to, the specific identity of the recipient of the message and adding the ability to have a per-message offline analysis that determines whether to trigger that a message is suspect. In one embodiment, the analysis can be in-line or asynchronous, off-line that would then miss an initial or first example of an intrusion or extrusion message but would be used for other "like messages" where the criteria for "like" is an analysis trigger parameter that can be dynamically installed in the trigger monitoring system.

In various other embodiments, any other analysis trigger parameter, or combination of analysis trigger parameters, as discussed herein, and/or as known in the art at the time of filing, and/or as developed after the time of filing is defined.

In one embodiment, once the analysis trigger parameters are defined, machine-readable analysis trigger data is generated representing the analysis trigger parameters.

In one embodiment, the analysis trigger data is provided to the analysis trigger monitoring system associated with the hypervisor controlling the at least one virtual asset.

In one embodiment, the analysis trigger data and the analysis trigger monitoring system are then used to monitor at least part of the message data associated with at least some of the message traffic to, and/or from, the at least one virtual asset controlled by the hypervisor. In one embodiment, at least part of the message data associated with at least some of the message traffic to, and/or from, the at least one virtual asset is monitored to detect one or more of the one or more analysis trigger parameters within the message data.

In various embodiments, the methods and systems for hypervisor assisted intrusion and extrusion detection discussed herein are applied to network communications, e.g., message traffic, which is in both plain text or is encrypted. Consequently, in some embodiments, the analysis trigger monitoring system includes a decryption capability to decrypt outgoing and incoming message traffic as part of the monitoring and analysis.

In one embodiment, if one or more of the one or more analysis trigger parameters is detected within the message data associated with a given message, the classification data associated with that message is transformed into classification data indicating that the detected message including one or more of the one or more analysis trigger parameters is a suspect message.

Returning to FIG. 1, analysis trigger data 113 representing the defined analysis trigger parameters is shown as being provided to analysis trigger monitor 115 which uses analysis trigger data 113 to monitor message data 121 being relayed via network communications channel 150 to, and/or from, virtual asset 130 controlled by hypervisor 111.

In one embodiment, the detected suspect messages are temporarily permitted to be transmitted to, and/or from, the at least one virtual machine through the network communications channel, i.e. the first communications channel, with minimal delay. In one embodiment, this transmission is permitted in order to avoid significantly disrupting or delaying the transmission of messages without further evidence that the suspect messages are indeed malicious. However, for each detected suspect message, suspect message copy data is generated representing a copy of at least part of the message data making up the suspect message.

In one embodiment, the suspect message copy data is then transmitted to one or more analysis systems for further analysis in an "off-line" environment. In one embodiment, the suspect message copy data is transmitted to the one or more analysis systems via an analysis communication channel, also referred to herein as a second communications channel, that is distinct from the first communications channel, i.e., the network communications channel through which messages are sent to, and or transmitted from, the virtual asset controlled by the hypervisor. In this way, the transmission of the suspect message copy data, and the message subsequent analysis, does not affect the operation of the virtual asset, and/or the application, service, enterprise, and/or infrastructure associated with the virtual asset.

Referring back to FIG. 1, if analysis trigger monitor 115 detects one of the analysis trigger parameters of analysis trigger data 113 in message data 121, message data 121 is classified as suspect message data and this information is provided to copy and transfer module 117 where suspect message copy data, represented in FIG. 1 by message data copy 141, is generated and transmitted to detection and analysis system 140, i.e., an analysis system, via analysis channel 160 that is distinct from network communications channel 150.

In one embodiment, message data copy 141 is then provided to analysis module 143 of detection and analysis system 140. As seen in FIG. 1, detection and analysis system 140 is illustratively shown as being implemented in computing environment 12. As noted above, the implementation of detection and analysis system 140 in computing environment 12 is shown for illustrative purposes only and, in other embodiments, detection and analysis system 140 could be implemented in computing environment 10, computing environment 11, or partially implemented in any of computing environment 10, computing environment 11, and/or computing environment 12.

In one embodiment, results data 145 is generated by detection and analysis system 140 indicating the results of the analysis of the message data copy data 141 by analysis module 143.

Figure 2:
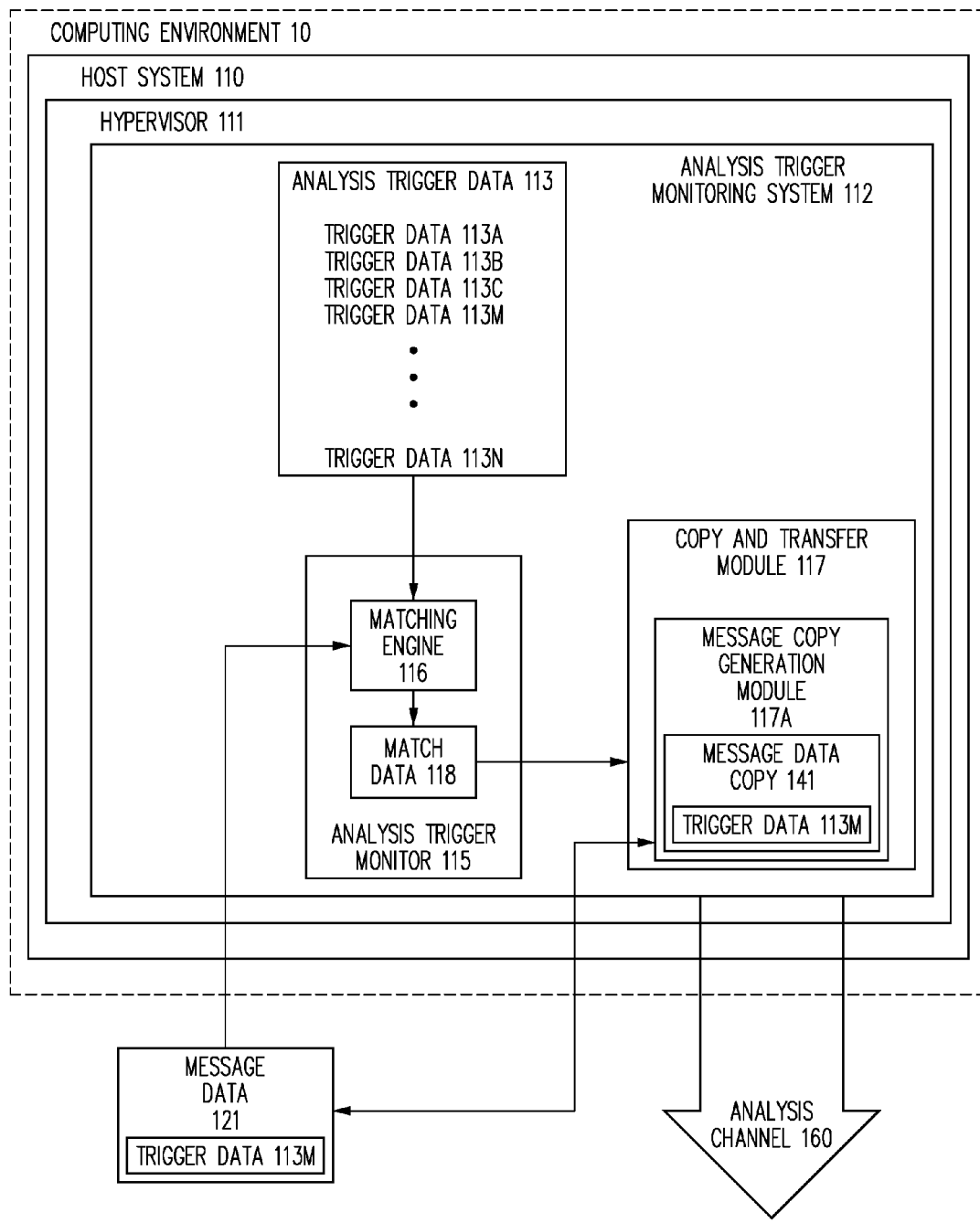
FIG. 2 is a functional diagram of a hypervisor including an analysis and trigger monitor, analysis trigger data, and a copy and transfer module in accordance with one embodiment.

FIG. 2 is a more detailed functional diagram of hypervisor 111, as implemented on host computing system 110 in computing environment 10. As seen in FIG. 2, hypervisor 111 includes analysis trigger monitoring system 112. As seen in FIG. 2, analysis trigger monitoring system 112 includes analysis trigger data 113, analysis trigger monitor 115, and copy and transfer module 117, shown in more detail in FIG. 2.

As also seen in FIG. 2, analysis trigger data 113 includes trigger data 113A, trigger data 113B, trigger data 113C, and trigger data 113M through trigger data 113N. In one embodiment, each of trigger data 113A through trigger data 113N represents a specific one of the one or more defined analysis trigger parameters.

As also seen in FIG. 2, analysis trigger monitor 115 includes matching engine 116 and match data 118. As also seen in FIG. 2, copy and transfer module 117 includes message copy generation module 117A where message data copy 141 is generated including matching trigger data 113M.

Also shown in FIG. 2 is message data 121, including matching trigger data 113M and analysis channel 160.

In one embodiment, matching engine 116 of analysis trigger monitor 115 is provided message data 121 and analysis trigger data 113 as input data. In this specific illustrative example, message data 121 includes trigger data 113M which is analyzed and matched by matching engine 116 with trigger data 113M of analysis trigger data 113. In this specific illustrative example, the detection of matching trigger data 113M in message data 121 results in match data 118 being generated and transferred to copy and transfer module 117.

In one embodiment, at copy and transfer module 117 a copy of message data 121, represented by message data copy 141, is generated by message copy generation module 117A including the matching trigger data 113M. In one embodiment, multiple analysis systems are provided that are specifically implemented to analyze specific analysis trigger parameters. Consequently, in one embodiment, the particular analysis system to which a given example of suspect message data is transmitted is determined, at least in part, by the specific analysis trigger parameter detected in the suspect message from which the suspect message copy data was derived. Consequently, in one embodiment, matching trigger data 113M is used, at least in part, to determine which analysis system of one or more specialized analysis systems is to receive message data copy 141 via analysis channel 160.

In one embodiment, if, as a result of the analysis of the suspect message copy data by one or more of the analysis systems, it is determined that the suspect message is indeed associated with an intrusion or extrusion attack, one or more systems, entities, and or parties, are alerted to the situation so that appropriate protective action can be taken.

In one embodiment, if, as a result of the analysis of the suspect message copy data by one or more of the analysis systems, it is determined that the suspect message is indeed associated with an intrusion or extrusion attack, one or more protective actions are automatically taken to prevent further infection of the at least one virtual asset, and/or other virtual assets, and/or the application, service, infrastructure, or computing environment, associated with the now identified infected virtual asset.

In various embodiments, the protective actions taken can include, but are not limited to, isolating the virtual asset such that the virtual asset can still continue to operate yet in total isolation of all other virtual assets; partially isolating the virtual asset such that the virtual asset is allowed to connect to some very specific virtual assets yet have most of its communication channels blocked; "killing" or terminating the virtual asset; repairing the virtual asset by re-loading the compromised sub-components of the virtual asset; and/or any other protective actions, or combination of protective actions, discussed herein, and/or as known in the art at the time of filing, and/or as developed, or become known, after the time of filing.

Using the method and system for hypervisor assisted intrusion and extrusion detection discussed above, intrusion and extrusion attacks can be detected using existing cloud computing environment infrastructure, including hypervisors, and without the need for devoting extensive and/or specialized resources. Consequently, using the method and system for hypervisor's assisted intrusion and extrusion detection, intrusion and extrusion events can be efficiently and effectively detected; thereby making distributed computing environments, such as cloud computing environments, more secure.

Process

In accordance with one embodiment, a process for hypervisor assisted intrusion and extrusion detection includes providing a hypervisor through which a virtual asset is controlled. In one embodiment, the hypervisor includes an analysis trigger monitoring system.

In one embodiment, one or more analysis trigger parameters are defined and analysis trigger data representing the analysis trigger parameters is generated. The analysis trigger data is then provided to the analysis trigger monitoring system and the analysis trigger monitoring system is used to monitor at least a portion of the message traffic sent to, and/or sent from, the virtual asset controlled by the hypervisor to detect any message including one or more of the one or more analysis trigger parameters.

In one embodiment, any detected message including one or more of the one or more analysis trigger parameters is classified as a suspect message. In one embodiment, for each suspect message, suspect message copy data is generated representing a copy of at least a portion of the suspect message. In one embodiment, the suspect message copy data is then transferred to one or more analysis systems for further analysis.

In accordance with one embodiment, process for hypervisor assisted intrusion and extrusion detection implemented, at least in part, by one or more computing systems.

As used herein, the term "computing system", includes, but is not limited to, a server computing system; a workstation; a desktop computing system; a database system or storage cluster; a switching system; a router; any hardware system; any communications systems; any form of proxy system; a gateway system; a firewall system; a load balancing system; or any device, subsystem, or mechanism that includes components that can execute all, or part, of any one of the processes and/or operations as described herein.

In addition, as used herein, the term computing system, can denote, but is not limited to, systems made up of multiple server computing systems; workstations; desktop computing systems; database systems or storage clusters; switching systems; routers; hardware systems; communications systems; proxy systems; gateway systems; firewall systems; load balancing systems; or any devices that can be used to perform the processes and/or operations as described herein.

In various embodiments, the one or more computing systems implementing the process for hypervisor assisted intrusion and extrusion detection are logically or physically located, and/or associated with, two or more computing environments. As used herein, the term "computing environment" includes, but is not limited to, a logical or physical grouping of connected or networked computing systems using the same infrastructure and systems such as, but not limited to, hardware systems, software systems, and networking/communications systems. Typically, computing environments are either known environments, e.g., "trusted" environments, or unknown, e.g., "untrusted" environments. Typically trusted computing environments are those where the components, infrastructure, communication and networking systems, and security systems associated with the computing systems making up the trusted computing environment, are either under the control of, or known to, a party. In contrast, unknown, or untrusted computing environments are environments and systems where the components, infrastructure, communication and networking systems, and security systems implemented and associated with the computing systems making up the untrusted computing environment, are not under the control of, and/or are not known by, a party, and/or are dynamically configured with new elements capable of being added that are unknown to the party.

Examples of trusted computing environments include the components making up data centers associated with, and/or controlled by, a party and/or any computing systems, and/or networks of computing systems, associated with, known by, and/or controlled by, a party. Examples of untrusted computing environments include, but are not limited to, public networks, such as the Internet, various cloud-based computing environments, and various other forms of distributed computing systems.

It is often the case that a party desires to transfer data to, and/or from, a first computing environment that is an untrusted computing environment, such as, but not limited to, a public cloud, a virtual private cloud, and a trusted computing environment, such as, but not limited to, networks of computing systems in a data center controlled by, and/or associated with, the party. However, in other situations a party may wish to transfer data between two trusted computing environments, and/or two untrusted computing environments.

In one embodiment, two or more computing systems, and/or two or more computing environments, are connected by one or more communications channels, and/or distributed computing system networks, such as, but not limited to: a public cloud; a private cloud; a virtual private cloud (VPN); a subnet; any general network, communications network, or general network/communications network system; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

Figure 3:
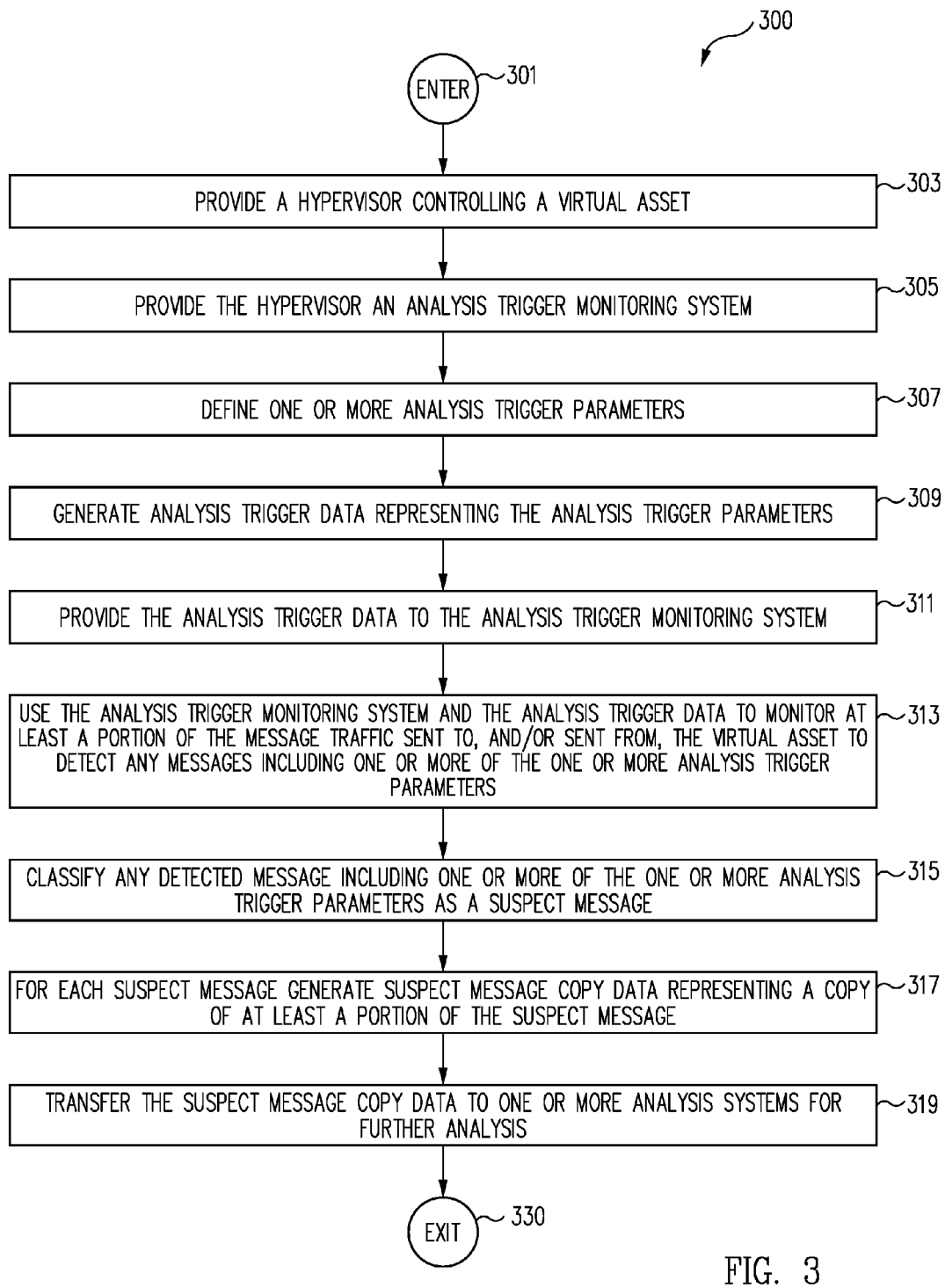
FIG. 3 is a flow chart depicting a process for hypervisor assisted intrusion and extrusion detection in accordance with one embodiment.

FIG. 3 is a flow chart of a process 300 for hypervisor assisted intrusion and extrusion detection in accordance with one embodiment. In one embodiment, process 300 for hypervisor assisted intrusion and extrusion detection begins at ENTER OPERATION 301 of FIG. 3 and process flow proceeds to PROVIDE A HYPERVISOR CONTROLLING ALL MESSAGE TRAFFIC SENT TO, AND/OR SENT FROM, A VIRTUAL ASSET OPERATION 303.

In one embodiment, at PROVIDE A HYPERVISOR CONTROLLING ALL MESSAGE TRAFFIC SENT TO, AND/OR SENT FROM, A VIRTUAL ASSET OPERATION 303 a cloud computing environment is provided including one or more virtual assets associated with, and controlled by, a hypervisor.

As used herein, the term "virtual asset" includes any virtualized entity or resource, and/or part of an actual, or "bare metal" entity requiring access to various resources, and types of resources. In various embodiments, the virtual assets can be, but are not limited to, virtual machines, virtual servers, and instances implemented in a cloud computing environment; databases implemented, or associated with, a cloud computing environment and/or instances implemented in a cloud computing environment; services associated with, and or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc. requiring access to various resources, and/or types of resources, located within a data center, within a cloud computing environment, and/or any other physical or logical location, as discussed herein, and/or as known/available in the art at the time of filing, and/or as developed/made available after the time of filing.

In one embodiment, the virtual asset creation data is generated through a virtual asset creation system such as a virtual asset template through which the creator of a virtual asset can generate operational logic and assign resources and attributes to the virtual asset.

As used herein, the term "hypervisor", also referred to as a virtual machine monitor (VMM), indicates computer software, firmware, or hardware that creates, and/or runs/controls, virtual assets in a cloud computing environment. In various embodiments, the hypervisor is implemented, or run, in association with, a host system. In various embodiments, the host system itself hosts the one or more virtual assets. In general, a hypervisor manages the execution of the virtual assets and, in particular, is charged with controlling, and/or relaying, message traffic coming into the one or more virtual assets, and/or being transmitted out of the one or more virtual assets.

In various embodiments, the message traffic to, from, and between, the virtual assets controlled by the hypervisor is transmitted through at least one communications channel, e.g., a network communications channel, herein also referred to as a first communications channel.

In one embodiment, once a cloud computing environment is provided including one or more virtual assets associated with, and controlled by, a hypervisor at PROVIDE A HYPERVISOR CONTROLLING ALL MESSAGE TRAFFIC SENT TO, AND/OR SENT FROM, A VIRTUAL ASSET OPERATION 303, process flow proceeds to PROVIDE THE HYPERVISOR AN ANALYSIS TRIGGER MONITORING SYSTEM OPERATION 305.

In various embodiments, the message traffic to, from, and between the virtual assets controlled by the hypervisor of PROVIDE A HYPERVISOR CONTROLLING ALL MESSAGE TRAFFIC SENT TO, AND/OR SENT FROM, A VIRTUAL ASSET OPERATION 303 are susceptible to the introduction of malware and, in particular, intrusion and extrusion related malware.

As noted above, the fact that malware can be introduced into the cloud computing environment is a long standing problem. As also noted above, the introduction of malware into a virtual asset via one or more messages included in message traffic controlled by the hypervisor coming into the virtual asset, and therefore into an application, service, enterprise, or cloud infrastructure of a cloud computing environment, is known as intrusion. However, as also noted above, once introduced, some forms of malware take control of some, or all, of the infected virtual asset functionality and use the virtual asset to send outbound messages and data through the message traffic controlled by the hypervisor. This outbound malware mechanism is referred to as extrusion.

Consequently, the detection of both malware intrusion and extrusion is an important part of making cloud computing environments more secure. However, a given cloud computing environment can include hundreds, thousands, or even millions, of virtual assets, owned or used by hundreds, thousands, or even millions, of parties. Consequently, detecting malware intrusion and extrusion is currently an extremely difficult and resource intensive task.

To address this issue, in one embodiment, the hypervisor controlling at least one virtual asset of PROVIDE A HYPERVISOR CONTROLLING ALL MESSAGE TRAFFIC SENT TO, AND/OR SENT FROM, A VIRTUAL ASSET OPERATION 303 is provided an analysis trigger monitoring system at PROVIDE THE HYPERVISOR AN ANALYSIS TRIGGER MONITORING SYSTEM OPERATION 305.

In various embodiments, the analysis trigger monitoring system of PROVIDE THE HYPERVISOR AN ANALYSIS TRIGGER MONITORING SYSTEM OPERATION 305 is a module of software, and/or firmware, and/or hardware, capable of monitoring at least a portion of the message traffic to, between, and from, the at least one virtual asset controlled by the hypervisor of PROVIDE A HYPERVISOR CONTROLLING ALL MESSAGE TRAFFIC SENT TO, AND/OR SENT FROM, A VIRTUAL ASSET OPERATION 303.

As discussed below, in various embodiments, process 300 for hypervisor assisted intrusion and extrusion detection discussed herein is applied to network communications, e.g., message traffic, which is in both plain text or is encrypted. Consequently, in some embodiments, the analysis trigger monitoring system of PROVIDE A HYPERVISOR CONTROLLING ALL MESSAGE TRAFFIC SENT TO, AND/OR SENT FROM, A VIRTUAL ASSET OPERATION 303 includes a decryption capability to decrypt outgoing and incoming message traffic as part of the monitoring and analysis.

In one embodiment, once the hypervisor controlling at least one virtual asset of PROVIDE A HYPERVISOR CONTROLLING ALL MESSAGE TRAFFIC SENT TO, AND/OR SENT FROM, A VIRTUAL ASSET OPERATION 303 is provided an analysis trigger monitoring system at PROVIDE THE HYPERVISOR AN ANALYSIS TRIGGER MONITORING SYSTEM OPERATION 305, process flow proceeds to DEFINE ONE OR MORE ANALYSIS TRIGGER PARAMETERS OPERATION 307.

In one embodiment, at DEFINE ONE OR MORE ANALYSIS TRIGGER PARAMETERS OPERATION 307 one or more analysis trigger parameters are defined such that if one or more of the one or more analysis trigger parameters are detected in a message to, or from, a virtual asset, then that message is deemed a suspect message that is potentially associated with an intrusion or extrusion attack on the virtual asset, and/or the computing environment.

In various embodiments, specific examples of analysis trigger parameters of DEFINE ONE OR MORE ANALYSIS TRIGGER PARAMETERS OPERATION 307 include, but are not limited to, the presence of an IP address in a message indicating a designated suspect origin or destination. In one embodiment, this analysis trigger parameter is used to detect messages coming from, or going to, a designated suspicious entity that is suspected of being associated with malware. In various embodiments, the IP addresses associated with designated suspicious entities, and/or the identity of the entities themselves, is provided by one or more third parties.

In various embodiments, specific examples of analysis trigger parameters of DEFINE ONE OR MORE ANALYSIS TRIGGER PARAMETERS OPERATION 307 include, but are not limited to, the presence of an IP address in a message indicating a designated suspect geographical region. In one embodiment, this analysis trigger parameter is used to detect messages coming from, or going to, geographical locations that are known to be associated with malware. In various embodiments, the geographical locations known to be associated with malware are provided by the one or more third parties.

In various embodiments, specific examples of analysis trigger parameters of DEFINE ONE OR MORE ANALYSIS TRIGGER PARAMETERS OPERATION 307 include, but are not limited to, the presence of an IP address in a message indicating an origin or destination that is not included on a list of authorized, or expected, origins or destinations of messages to be received by, or transmitted from, the virtual asset. In one embodiment, this analysis trigger parameter is used to detect message traffic that would not be expected to be generated in the normal course of operation of the virtual asset according to its operational mission.

In various embodiments, specific examples of analysis trigger parameters of DEFINE ONE OR MORE ANALYSIS TRIGGER PARAMETERS OPERATION 307 include, but are not limited to, the presence of an IP address in a message indicating a geographical location that is not included on a list of authorized, or expected, geographical locations to be associated with messages to be received by, or transmitted from, and the virtual asset. In one embodiment, this analysis trigger parameter is used to detect message traffic that would not be expected to be generated in the normal course of operation of the virtual asset according to its operational instructions.

In various embodiments, specific examples of analysis trigger parameters of DEFINE ONE OR MORE ANALYSIS TRIGGER PARAMETERS OPERATION 307 include, but are not limited to, setting a threshold maximum message size and determining that a given message is of a size exceeding the threshold maximum message size. In one embodiment, this analysis trigger parameter takes advantage of the fact that many forms of malware require message sizes larger than those normally associated with a given virtual asset in order to deliver the malware necessary to execute the malicious intent.

In various embodiments, specific examples of analysis trigger parameters of DEFINE ONE OR MORE ANALYSIS TRIGGER PARAMETERS OPERATION 307 include, but are not limited to, setting a threshold minimum message size and determining that a given message is of a size that is less than the threshold minimum message size. In one embodiment, this analysis trigger is used to detect messages of a size that is smaller than a message size determined to be typical with respect to a given virtual asset, and that are therefore suspicious.

In various embodiments, specific examples of analysis trigger parameters of DEFINE ONE OR MORE ANALYSIS TRIGGER PARAMETERS OPERATION 307 include, but are not limited to, analysis trigger parameters based on frequency analysis of the access pattern indicating that messages arrive too frequently or too infrequently.

In various embodiments, specific examples of analysis trigger parameters of DEFINE ONE OR MORE ANALYSIS TRIGGER PARAMETERS OPERATION 307 include, but are not limited to, a hash value of the message data that is not included in a list of allowed hash values. In one embodiment, this analysis trigger parameter is used in conjunction with a hash-based analysis of at least part of a given message being sent to, and or transmitted from, a virtual asset. In one embodiment, allowable hash values are defined and then a hash is performed on at least part of a given message. In one embodiment, if the hash of the portion of the given message does not match any of the allowed hash values, the message is determined to be suspect.

In various embodiments, specific examples of analysis trigger parameters of DEFINE ONE OR MORE ANALYSIS TRIGGER PARAMETERS OPERATION 307 include, but are not limited to, an MD5 value of the message data that is not included in a list of allowed MD5 values.

MD5 (Message-Digest algorithm five) is a widely used cryptographic hash function producing a 128 bit (16 byte) hash value that is typically expressed as a 32 digit hexadecimal number. In one embodiment, the MD5 algorithm is applied to at least part of the message data associated with a given message and the resulting MD5 value is compared with a list of allowed MD5 values. If the resulting MD5 value does not match any of the allowed MD5 values, then the message is considered suspect.

In various embodiments, specific examples of analysis trigger parameters of DEFINE ONE OR MORE ANALYSIS TRIGGER PARAMETERS OPERATION 307 include, but are not limited to, the specific identity of the sender of the message and adding the ability to have a per-message offline analysis that determines whether to trigger that a message is suspect. In one embodiment, the analysis can be in-line or asynchronous, off-line that would then miss an initial or first example of an intrusion or extrusion message but would be used for other "like messages" where the criteria for "like" is an analysis trigger parameter that can be dynamically installed in the trigger monitoring system.

In various embodiments, specific examples of analysis trigger parameters of DEFINE ONE OR MORE ANALYSIS TRIGGER PARAMETERS OPERATION 307 include, but are not limited to, the specific identity of the recipient of the message and adding the ability to have a per-message offline analysis that determines whether to trigger that a message is suspect. In one embodiment, the analysis can be in-line or asynchronous, off-line that would then miss an initial or first example of an intrusion or extrusion message but would be used for other "like messages" where the criteria for "like" is an analysis trigger parameter that can be dynamically installed in the trigger monitoring system.

In various other embodiments, any other analysis trigger parameter, or combination of analysis trigger parameters, as discussed herein, and/or as known in the art at the time of filing, and/or as developed after the time of filing are defined at DEFINE ONE OR MORE ANALYSIS TRIGGER PARAMETERS OPERATION 307.

In one embodiment, once one or more analysis trigger parameters are defined at DEFINE ONE OR MORE ANALYSIS TRIGGER PARAMETERS OPERATION 307, process flow proceeds to GENERATE ANALYSIS TRIGGER DATA REPRESENTING THE ANALYSIS TRIGGER PARAMETERS OPERATION 309.

In one embodiment, at GENERATE ANALYSIS TRIGGER DATA REPRESENTING THE ANALYSIS TRIGGER PARAMETERS OPERATION 309 machine-readable analysis trigger data is generated representing the analysis trigger parameters of DEFINE ONE OR MORE ANALYSIS TRIGGER PARAMETERS OPERATION 307.

In one embodiment, once machine-readable analysis trigger data is generated representing the analysis trigger parameters of DEFINE ONE OR MORE ANALYSIS TRIGGER PARAMETERS OPERATION 307 at GENERATE ANALYSIS TRIGGER DATA REPRESENTING THE ANALYSIS TRIGGER PARAMETERS OPERATION 309, process flow proceeds PROVIDE THE ANALYSIS TRIGGER DATA TO THE ANALYSIS TRIGGER MONITORING SYSTEM OPERATION 311.

In one embodiment, at PROVIDE THE ANALYSIS TRIGGER DATA TO THE ANALYSIS TRIGGER MONITORING SYSTEM OPERATION 311 the analysis trigger data of GENERATE ANALYSIS TRIGGER DATA REPRESENTING THE ANALYSIS TRIGGER PARAMETERS OPERATION 309 is provided to the analysis trigger monitoring system of PROVIDE THE HYPERVISOR AN ANALYSIS TRIGGER MONITORING SYSTEM OPERATION 305 associated with the hypervisor controlling the at least one virtual asset of PROVIDE A HYPERVISOR CONTROLLING ALL MESSAGE TRAFFIC SENT TO, AND/OR SENT FROM, A VIRTUAL ASSET OPERATION 303.

In one embodiment, once the analysis trigger data of GENERATE ANALYSIS TRIGGER DATA REPRESENTING THE ANALYSIS TRIGGER PARAMETERS OPERATION 309 is provided to the analysis trigger monitoring system of PROVIDE THE HYPERVISOR AN ANALYSIS TRIGGER MONITORING SYSTEM OPERATION 305 associated with the hypervisor controlling the at least one virtual asset of PROVIDE A HYPERVISOR CONTROLLING ALL MESSAGE TRAFFIC SENT TO, AND/OR SENT FROM, A VIRTUAL ASSET OPERATION 303 at PROVIDE THE ANALYSIS TRIGGER DATA TO THE ANALYSIS TRIGGER MONITORING SYSTEM OPERATION 311, process flow proceeds to USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313.

In one embodiment, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 the analysis trigger data of GENERATE ANALYSIS TRIGGER DATA REPRESENTING THE ANALYSIS TRIGGER PARAMETERS OPERATION 309 and the analysis trigger monitoring system of PROVIDE THE HYPERVISOR AN ANALYSIS TRIGGER MONITORING SYSTEM OPERATION 305 are then used to monitor at least part of the message data associated with at least some of the message traffic to, and/or from, the at least one virtual asset controlled by the hypervisor of PROVIDE A HYPERVISOR CONTROLLING ALL MESSAGE TRAFFIC SENT TO, AND/OR SENT FROM, A VIRTUAL ASSET OPERATION 303.

In various embodiments, process 300 for hypervisor assisted intrusion and extrusion detection discussed herein is applied to network communications, e.g., message traffic, which is in both plain text or is encrypted. Consequently, in some embodiments, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 the analysis trigger monitoring system includes a decryption capability to decrypt outgoing and incoming message traffic as part of the monitoring and analysis.

In one embodiment, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 a sample part of the message data associated with at least some of the message traffic to, and/or from, the at least one virtual asset is monitored to detect one or more of the one or more analysis trigger parameters within the message data.

In one embodiment, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 all of the message data associated with at least part of the message traffic to, and/or from, the at least one virtual asset is monitored to detect one or more of the one or more analysis trigger parameters within the message data.

In one embodiment, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 at least part of the message data associated with all of the message traffic to, and/or from, the at least one virtual asset is monitored to detect one or more of the one or more analysis trigger parameters within the message data.

In one embodiment, at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 all of the message data associated with all of the message traffic to, and/or from, the at least one virtual asset is monitored to detect one or more of the one or more analysis trigger parameters within the message data.

In one embodiment, once the analysis trigger data of GENERATE ANALYSIS TRIGGER DATA REPRESENTING THE ANALYSIS TRIGGER PARAMETERS OPERATION 309 and the analysis trigger monitoring system of PROVIDE THE HYPERVISOR AN ANALYSIS TRIGGER MONITORING SYSTEM OPERATION 305 are then used to monitor at least part of the message data associated with at least some of the message traffic to, and/or from, the at least one virtual asset controlled by the hypervisor of PROVIDE A HYPERVISOR CONTROLLING ALL MESSAGE TRAFFIC SENT TO, AND/OR SENT FROM, A VIRTUAL ASSET OPERATION 303 at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313, process flow proceeds to CLASSIFY ANY DETECTED MESSAGE INCLUDING ONE OR MORE OF THE ONE OR MORE ANALYSIS TRIGGER PARAMETERS AS A SUSPECT MESSAGE OPERATION 315.

In one embodiment, at CLASSIFY ANY DETECTED MESSAGE INCLUDING ONE OR MORE OF THE ONE OR MORE ANALYSIS TRIGGER PARAMETERS AS A SUSPECT MESSAGE OPERATION 315, if one or more of the one or more analysis trigger parameters of DEFINE ONE OR MORE ANALYSIS TRIGGER PARAMETERS OPERATION 307 is detected within the message data associated with a given message, the classification data associated with that message is transformed into classification data indicating that the detected message including one or more of the one or more analysis trigger parameters is a suspect message.

In one embodiment, once the classification data associated with messages having one or more of the one or more analysis trigger parameters of DEFINE ONE OR MORE ANALYSIS TRIGGER PARAMETERS OPERATION 307 is transformed into classification data indicating that the detected message including one or more of the one or more analysis trigger parameters is a suspect message at CLASSIFY ANY DETECTED MESSAGE INCLUDING ONE OR MORE OF THE ONE OR MORE ANALYSIS TRIGGER PARAMETERS AS A SUSPECT MESSAGE OPERATION 315, process flow proceeds to FOR EACH SUSPECT MESSAGE GENERATE SUSPECT MESSAGE COPY DATA REPRESENTING A COPY OF AT LEAST A PORTION OF THE SUSPECT MESSAGE OPERATION 317.

In one embodiment, the detected suspect messages of CLASSIFY ANY DETECTED MESSAGE INCLUDING ONE OR MORE OF THE ONE OR MORE ANALYSIS TRIGGER PARAMETERS AS A SUSPECT MESSAGE OPERATION 315 are temporarily permitted to be transmitted to, and/or from, the at least one virtual machine through the network communications channel, i.e. the first communications channel, with minimal delay.

In one embodiment, this transmission is permitted in order to avoid significantly disrupting or delaying the transmission of messages without further evidence that the suspect messages are indeed malicious. However, in one embodiment, at FOR EACH SUSPECT MESSAGE GENERATE SUSPECT MESSAGE COPY DATA REPRESENTING A COPY OF AT LEAST A PORTION OF THE SUSPECT MESSAGE OPERATION 317, for each detected suspect message of CLASSIFY ANY DETECTED MESSAGE INCLUDING ONE OR MORE OF THE ONE OR MORE ANALYSIS TRIGGER PARAMETERS AS A SUSPECT MESSAGE OPERATION 315, suspect message copy data is generated representing a copy of at least part of the message data making up the suspect message.

In one embodiment, once for each detected suspect message of CLASSIFY ANY DETECTED MESSAGE INCLUDING ONE OR MORE OF THE ONE OR MORE ANALYSIS TRIGGER PARAMETERS AS A SUSPECT MESSAGE OPERATION 315, suspect message copy data is generated representing a copy of at least part of the message data making up the suspect message at FOR EACH SUSPECT MESSAGE GENERATE SUSPECT MESSAGE COPY DATA REPRESENTING A COPY OF AT LEAST A PORTION OF THE SUSPECT MESSAGE OPERATION 317, process flow proceeds to TRANSFER THE SUSPECT MESSAGE COPY DATA TO ONE OR MORE ANALYSIS SYSTEMS FOR FURTHER ANALYSIS OPERATION 319.

In one embodiment, at TRANSFER THE SUSPECT MESSAGE COPY DATA TO ONE OR MORE ANALYSIS SYSTEMS FOR FURTHER ANALYSIS OPERATION 319, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 317 is transmitted to one or more analysis systems for further analysis in an "off-line" environment.

In one embodiment, at TRANSFER THE SUSPECT MESSAGE COPY DATA TO ONE OR MORE ANALYSIS SYSTEMS FOR FURTHER ANALYSIS OPERATION 319, the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 317 is transmitted to the one or more analysis systems via an analysis communication channel, also referred to herein as a second communications channel, that is distinct from the first communications channel, i.e., the network communications channel through which messages are sent to, and or transmitted from, the virtual asset controlled by the hypervisor of PROVIDE A HYPERVISOR CONTROLLING ALL MESSAGE TRAFFIC SENT TO, AND/OR SENT FROM, A VIRTUAL ASSET OPERATION 303. In this way, the transmission of the suspect message copy data, and the message subsequent analysis, does not affect the operation of the virtual asset, and/or the application, service, enterprise, and/or infrastructure associated with the virtual asset.

In one embodiment, multiple analysis systems are provided at TRANSFER THE SUSPECT MESSAGE COPY DATA TO ONE OR MORE ANALYSIS SYSTEMS FOR FURTHER ANALYSIS OPERATION 319 that are specifically implemented to analyze specific analysis trigger parameters of DEFINE ONE OR MORE ANALYSIS TRIGGER PARAMETERS OPERATION 307.

Consequently, in one embodiment, the particular analysis system to which a given example of suspect message data is transmitted at TRANSFER THE SUSPECT MESSAGE COPY DATA TO ONE OR MORE ANALYSIS SYSTEMS FOR FURTHER ANALYSIS OPERATION 319 is determined, at least in part, by the specific analysis trigger parameter detected in the suspect message at USE THE ANALYSIS TRIGGER MONITORING SYSTEM AND THE ANALYSIS TRIGGER DATA TO MONITOR AT LEAST A PORTION OF THE MESSAGE TRAFFIC SENT TO, AND/OR SENT FROM, THE VIRTUAL ASSET TO DETECT ANY MESSAGES INCLUDING ONE OR MORE OF THE ONE OR MORE ANALYSIS TRIGGER PARAMETERS OPERATION 313 from which the suspect message copy data was derived at FOR EACH SUSPECT MESSAGE GENERATE SUSPECT MESSAGE COPY DATA REPRESENTING A COPY OF AT LEAST A PORTION OF THE SUSPECT MESSAGE OPERATION 317.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 319, it is determined that the suspect message is indeed associated with an intrusion or extrusion attack, one or more systems, entities, and or parties, are alerted to the situation so that appropriate protective action can be taken.

In one embodiment, if, as a result of the analysis of the suspect message copy data by one or more of the analysis systems at TRANSFER THE SUSPECT MESSAGE COPY DATA TO ONE OR MORE ANALYSIS SYSTEMS FOR FURTHER ANALYSIS OPERATION 319, it is determined that the suspect message is indeed associated with an intrusion or extrusion attack, one or more protective actions are automatically taken to prevent further infection of the at least one virtual asset, and/or other virtual assets, and/or the application, service, infrastructure, or computing environment, associated with the now identified infected virtual asset.

In various embodiments, the protective actions taken can include, but are not limited to, isolating the virtual asset such that the virtual asset can still continue to operate yet in total isolation of all other virtual assets; partially isolating the virtual asset such that the virtual asset is allowed to connect to some very specific virtual assets yet have most of its communication channels blocked; "killing" or terminating the virtual asset; repairing the virtual asset by re-loading the compromised sub-components of the virtual asset; and/or any other protective actions, or combination of protective actions, discussed herein, and/or as known in the art at the time of filing, and/or as developed, or become known, after the time of filing.

In one embodiment, once the suspect message copy data of FOR EACH SUSPECT MESSAGE GENERATE SUSPECT MESSAGE COPY DATA REPRESENTING A COPY OF AT LEAST A PORTION OF THE SUSPECT MESSAGE OPERATION 317 is transmitted to one or more analysis systems for further analysis in an "off-line" environment at TRANSFER THE SUSPECT MESSAGE COPY DATA TO ONE OR MORE ANALYSIS SYSTEMS FOR FURTHER ANALYSIS OPERATION 319, process flow proceeds to EXIT OPERATION 330.

In one embodiment, at EXIT OPERATION 330 process 300 for hypervisor assisted intrusion and extrusion detection is exited to await new data.

Using process 300 for hypervisor assisted intrusion and extrusion detection discussed above, intrusion and extrusion attacks can be detected using existing cloud computing environment infrastructure, including hypervisors, and without the need for devoting extensive and/or specialized resources. Consequently, using process 300 for hypervisor assisted intrusion and extrusion detection, intrusion and extrusion events can be efficiently and effectively detected; thereby making distributed computing environments, such as cloud computing environments, more secure.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "aggregating", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for intrusion and extrusion detection comprising:
　at least one processor; and
　at least one memory coupled to the at least one processor, the at least one memory having stored therein instructions which when executed by any set of the one or more processors, perform a process for intrusion and extrusion detection, the process for intrusion and extrusion detection including:
　providing a network communications system, the network communications system controlling message traffic sent to, and/or sent from, a virtual asset;

providing the network communications system an analysis trigger monitoring system;

defining two or more analysis trigger parameters, the two or more analysis trigger parameters at least including an IP address indicating a designated suspect geographical region and frequency analysis indicating messages arrive at frequency greater than a defined threshold frequency;

generating analysis trigger data representing the analysis trigger parameters;

providing the analysis trigger data to the analysis trigger monitoring system;

using the analysis trigger monitoring system and the analysis trigger data to monitor at least a portion of the message traffic sent to, and/or sent from, the virtual asset controlled by the network communications system to detect any message satisfying one or more of the two or more analysis trigger parameters, wherein all message traffic sent to, and/or sent from, the virtual asset is relayed by the network communications system using a first communications channel;

classifying any detected message satisfying one or more of the two or more analysis trigger parameters as a suspect message;

for each suspect message generating suspect message copy data representing a copy of at least a portion of the suspect message; and transferring the suspect message copy data to one or more analysis systems for further analysis, the suspect message copy data being transferred to the one or more analysis systems through an analysis communications channel that is distinct from the first communications channel.

2. The system for intrusion and extrusion detection of claim 1 wherein the virtual asset is a virtual asset selected from the group of the virtual assets consisting of:
a virtual machine;
a virtual server;
a database or data store;
an instance in a cloud environment;
a cloud environment access system;
part of a mobile device;
part of a remote sensor;
part of a laptop;
part of a desktop;
part of a point-of-sale device;
part of an ATM; and
part of an electronic voting machine.

3. The system for intrusion and extrusion detection of claim 1 wherein the analysis trigger monitoring system monitors all of the message traffic sent to, and/or sent from, the virtual asset.

4. The system for intrusion and extrusion detection of claim 1 wherein the analysis trigger monitoring system monitors a sample portion of the message traffic sent to, and/or sent from, the virtual asset.

5. The system for intrusion and extrusion detection of claim 1 wherein at least one of the one or more analysis trigger parameters is selected from the group of analysis trigger parameters consisting of:
an IP address indicating a designated suspect origin or destination;
an IP address indicating a destination or origin not included in an allowed origin or destination list;
an IP address indicating a geographical region not included in an allowed geographical region list;
frequency analysis indicating messages arrive at frequency less than a defined threshold frequency;
a message size that exceeds a threshold maximum message size;
a message size that does not meet a threshold minimum message size;
a hash value of the message data that is not included in a list of allowed hash values;
an MD5 value of the message data that is not included in a list of allowed MD5 values;
the specific identity of the sender of the message; and
the specific identity of the recipient of the message.

6. The system for intrusion and extrusion detection of claim 1 wherein the suspect message copy data associated with a given suspect message is transferred to a specific analysis system of the one or more analysis systems for further analysis and/or action based, at least in part, on the analysis trigger parameter of the one or more analysis trigger parameters detected in the suspect message.

7. The system for intrusion and extrusion detection of claim 1 wherein if, as a result of the further analysis at the one or more analysis systems, the suspect message is determined to be an intrusion or extrusion related message, one or more designated parties are automatically informed.

8. The system for intrusion and extrusion detection of claim 1 wherein if, as a result of the further analysis at the one or more analysis systems, the suspect message is determined to be an intrusion or extrusion related message, one or more protective actions are automatically implemented.

9. A system for hypervisor assisted intrusion and extrusion detection comprising:
at least one processor; and
at least one memory coupled to the at least one processor, the at least one memory having stored therein instructions which when executed by any set of the one or more processors, perform a process for hypervisor assisted intrusion and extrusion detection, the process for hypervisor assisted intrusion and extrusion detection including:
providing a hypervisor, the hypervisor controlling a virtual asset;
providing the hypervisor an analysis trigger monitoring system;
defining two or more analysis trigger parameters, the two or more analysis trigger parameters at least including an IP address indicating a designated suspect geographical region and frequency analysis indicating messages arrive at frequency greater than a defined threshold frequency;
generating analysis trigger data representing the analysis trigger parameters;
providing the analysis trigger data to the analysis trigger monitoring system;
using the analysis trigger monitoring system and the analysis trigger data to monitor at least a portion of the message traffic sent to, and/or sent from, the virtual asset controlled by the hypervisor to detect any message satisfying one or more of the two or more analysis trigger parameters, wherein all message traffic sent to, and/or sent from, the virtual asset is relayed by the network communications system using a first communications channel;
classifying any detected message satisfying one or more of the two or more analysis trigger parameters as a suspect message;

for each suspect message generating suspect message copy data representing a copy of at least a portion of the suspect message; and transferring the suspect message copy data to one or more analysis systems for further analysis, the suspect message copy data being transferred to the one or more analysis systems through an analysis communications channel that is distinct from the first communications channel.

10. The system for hypervisor assisted intrusion and extrusion detection of claim 9 wherein the virtual asset is a virtual asset selected from the group of the virtual assets consisting of:
    a virtual machine;
    a virtual server;
    a database or data store;
    an instance in a cloud environment;
    a cloud environment access system;
    part of a mobile device;
    part of a remote sensor;
    part of a laptop;
    part of a desktop;
    part of a point-of-sale device;
    part of an ATM; and
    part of an electronic voting machine.

11. The system for hypervisor assisted intrusion and extrusion detection of claim 9 wherein the analysis trigger monitoring system monitors all of the message traffic sent to, and/or sent from, the virtual asset.

12. The system for hypervisor assisted intrusion and extrusion detection of claim 9 wherein the analysis trigger monitoring system monitors a sample portion of the message traffic sent to, and/or sent from, the virtual asset.

13. The system for hypervisor assisted intrusion and extrusion detection of claim 9 wherein at least one of the one or more analysis trigger parameters is selected from the group of analysis trigger parameters consisting of:
    an IP address indicating a designated suspect origin or destination;
    an IP address indicating a destination or origin not included in an allowed origin or destination list;
    an IP address indicating a geographical region not included in an allowed geographical region list;
    frequency analysis indicating messages arrive at frequency less than a defined threshold frequency;
    a message size that exceeds a threshold maximum message size;
    a message size that does not meet a threshold minimum message size;
    a hash value of the message data that is not included in a list of allowed hash values;
    an MD5 value of the message data that is not included in a list of allowed MD5 values;
    the specific identity of the sender of the message; and
    the specific identity of the recipient of the message.

14. The system for hypervisor assisted intrusion and extrusion detection of claim 9 wherein the suspect message copy data associated with a given suspect message is transferred to a specific analysis system of the one or more analysis systems for further analysis and/or action based, at least in part, on the analysis trigger parameter of the one or more analysis trigger parameters detected in the suspect message.

15. The system for hypervisor assisted intrusion and extrusion detection of claim 9 wherein if, as a result of the further analysis at the one or more analysis systems, the suspect message is determined to be an intrusion or extrusion related message, one or more designated parties are automatically informed.

16. The system for hypervisor assisted intrusion and extrusion detection of claim 9 wherein if, as a result of the further analysis at the one or more analysis systems, the suspect message is determined to be an intrusion or extrusion related message, one or more protective actions are automatically implemented.

17. A system for hypervisor assisted intrusion and extrusion detection comprising:
    a host system, the host system hosting at least one virtual asset;
    a hypervisor controlling the at least one virtual asset, the hypervisor being associated with the host system;
    a first communications channel through which all the message traffic sent to, and/or sent from, the at least one virtual asset controlled by the hypervisor;
    an analysis trigger monitoring module, the analysis trigger monitoring module being associated with the hypervisor;
    one or more analysis systems for performing analysis of copy data representing a copy of at least a portion of a suspect message;
    at least one analysis communications channel that is distinct from the first communications channel for transferring the suspect message copy data to the one or more analysis systems for further analysis;
    at least one processor; and
    at least one memory coupled to the at least one processor, the at least one memory having stored therein instructions which when executed by any set of the one or more processors, perform a process for hypervisor assisted intrusion and extrusion detection, the process for hypervisor assisted intrusion and extrusion detection including:
    defining two or more analysis trigger parameters, the two or more analysis trigger parameters at least including an IP address indicating a designated suspect geographical region and frequency analysis indicating messages arrive at frequency greater than a defined threshold frequency;
    generating analysis trigger data representing the analysis trigger parameters;
    providing the analysis trigger data to the analysis trigger monitoring module;
    using the analysis trigger monitoring module and the analysis trigger data to monitor at least a portion of the message traffic sent to, and/or sent from, the one or more virtual assets to detect any message satisfying one or more of the two or more analysis trigger parameters, wherein all message traffic sent to, and/or sent from, the virtual asset is relayed by the network communications system using a first communications channel;
    classifying any detected message satisfying one or more of the two or more analysis trigger parameters as a suspect message;
    for each suspect message generating suspect message copy data representing a copy of at least a portion of the suspect message; and
    transferring the suspect message copy data to one or more of the one or more analysis systems for further analysis, the suspect message copy data being transferred to the one or more analysis systems through an analysis communications channel that is distinct from the first communications channel.

18. The system for hypervisor assisted intrusion and extrusion detection of claim 17 wherein the at least one virtual asset is a virtual asset selected from the group of the virtual assets consisting of:
- a virtual machine;
- a virtual server;
- a database or data store;
- an instance in a cloud environment;
- a cloud environment access system;
- part of a mobile device;
- part of a remote sensor;
- part of a laptop;
- part of a desktop;
- part of a point-of-sale device;
- part of an ATM; and
- part of an electronic voting machine.

19. The system for hypervisor assisted intrusion and extrusion detection of claim 17 wherein the analysis trigger monitoring module monitors all of the message traffic sent to, and/or sent from, the at least one virtual asset.

20. The system for hypervisor assisted intrusion and extrusion detection of claim 17 wherein the analysis trigger monitoring module monitors a sample portion of the message traffic sent to, and/or sent from, the at least one virtual asset.

21. The system for hypervisor assisted intrusion and extrusion detection of claim 17 wherein at least one of the one or more analysis trigger parameters is selected from the group of analysis trigger parameters consisting of:
- an IP address indicating a designated suspect origin or destination;
- an IP address indicating a destination or origin not included in an allowed origin or destination list;
- an IP address indicating a geographical region not included in an allowed geographical region list;
- a message size that exceeds a threshold maximum message size;
- frequency analysis indicating messages arrive at frequency less than a defined threshold frequency;
- a message size that does not meet a threshold minimum message size;
- a hash value of the message data that is not included in a list of allowed hash values;
- an MD5 value of the message data that is not included in a list of allowed MD5 values;
- the specific identity of the sender of the message; and
- the specific identity of the recipient of the message.

22. The system for hypervisor assisted intrusion and extrusion detection of claim 17 wherein the suspect message copy data associated with a given suspect message is transferred to a specific analysis system of the one or more analysis systems for further analysis and/or action based, at least in part, on the analysis trigger parameter of the one or more analysis trigger parameters detected in the suspect message.

23. The system for hypervisor assisted intrusion and extrusion detection of claim 17 wherein if, as a result of the further analysis at the one or more analysis systems, the suspect message is determined to be an intrusion or extrusion related message, one or more designated parties are automatically informed.

24. The system for hypervisor assisted intrusion and extrusion detection of claim 17 wherein if, as a result of the further analysis at the one or more analysis systems, the suspect message is determined to be an intrusion or extrusion related message, one or more protective actions are automatically implemented.

* * * * *